Jan. 17, 1928.
G. F. LITCHFIELD
1,656,210
FRUIT GRADER
Filed Nov. 5, 1926
2 Sheets-Sheet 1
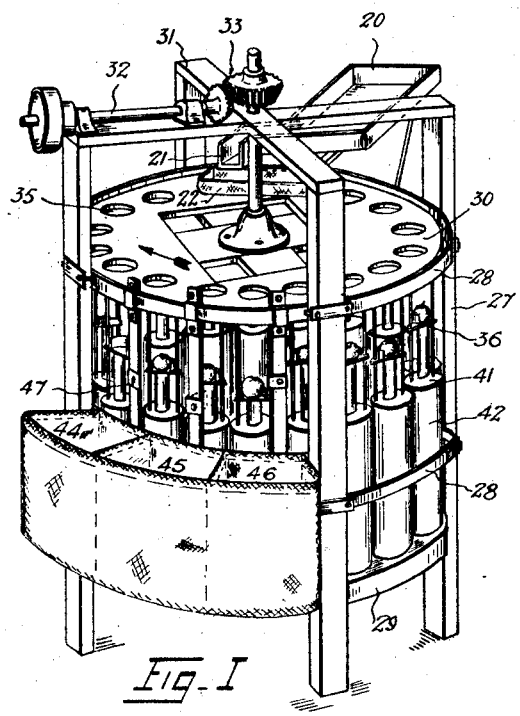
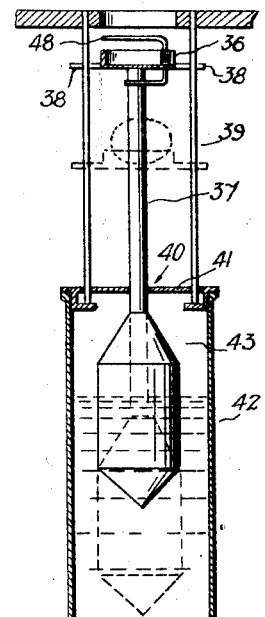
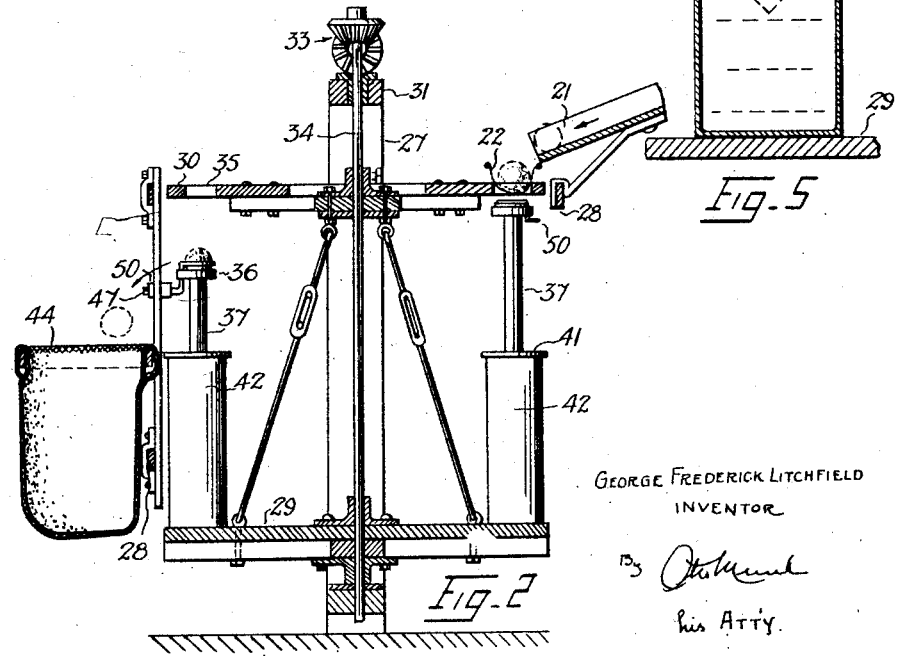
GEORGE FREDERICK LITCHFIELD
INVENTOR
his Atty.

Jan. 17, 1928.
G. F. LITCHFIELD
1,656,210
FRUIT GRADER
Filed Nov. 5, 1926
2 Sheets-Sheet 2
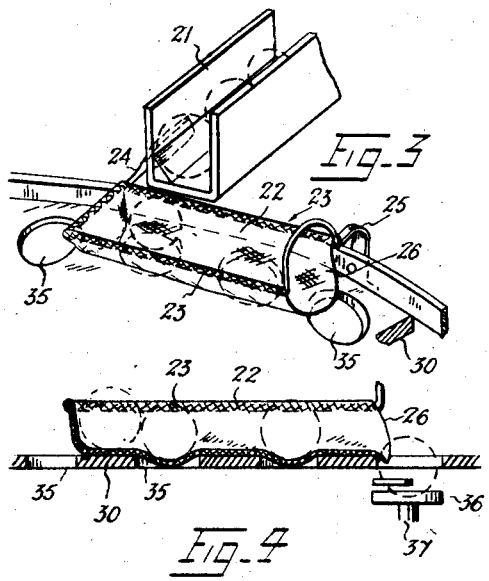
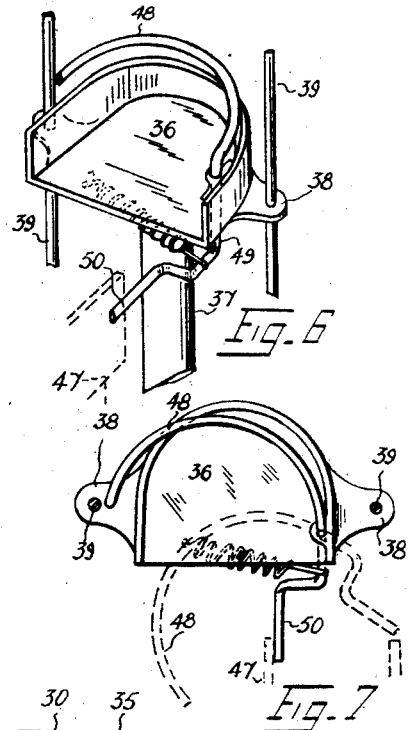
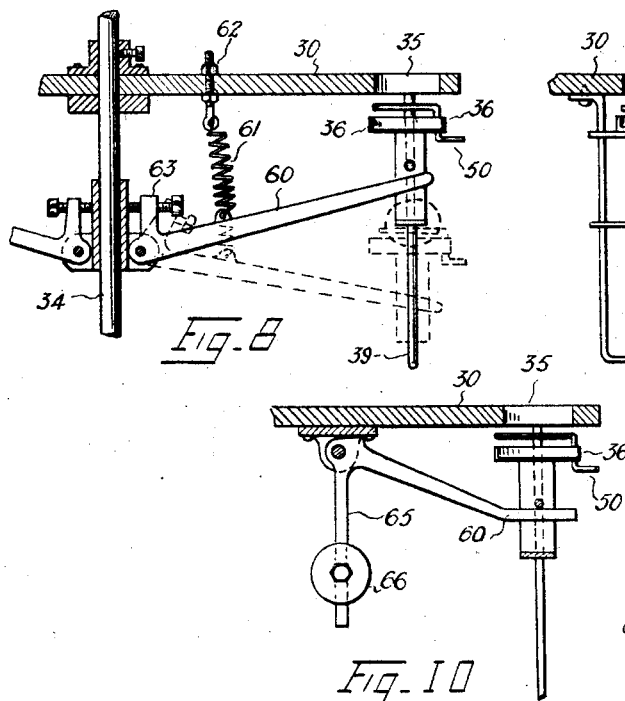
GEORGE FREDERICK LITCHFIELD
INVENTOR
his ATTY.

Patented Jan. 17, 1928.

1,656,210

UNITED STATES PATENT OFFICE.

GEORGE FREDERICK LITCHFIELD, OF KILLARA, NEW SOUTH WALES, AUSTRALIA.

FRUIT GRADER.

Application filed November 5, 1926, Serial No. 146,342, and in Australia January 15, 1926.

The present invention consists in a fruit grader which operates to separate fruit according to weight and irrespective of size or shape. It has special utility for the grading of fruit of unsymmetrical shape, such as pears, but is usable generally for all kinds of fruit, and is automatic in operation.

The fruit passes piece by piece through a trailing feeder onto a vertical spindle turret of pallets. Each pallet is counterbalanced; it rises as it is relieved of loading, and descends as load is imposed on it. Each piece of fruit is taken from the feeder by one of the pallets as it sweeps under the feeder. When the pallet takes a piece of fruit from the feeder it descends in the turret to a level corresponding with the weight of the piece, and carries the piece around to a gang of receiver receptacles which is disposed about the periphery of the turret. Each pallet is fitted with an ejector and the ejectors are respectively tripped by engagement with adjustably fixed strikers which are located in operative relation to the respective receiver receptacles. Thus the lightest weight fruit depresses the pallets only sufficiently to bring the pallet ejectors into register with the first striker, and heavier weight fruit depresses the pallets proportionately more and so brings their ejectors respectively into register with the strikers which are associated with No. 2, No. 3 (and so on) receiver receptacles. Each piece of fruit according to its weight is thus ejected into the receptacle which is allocated for fruit of that weight.

The pallets are preferably supported on floats, but they may be counterbalanced by springs or weights, the object in all these arrangements being identical, that is, to cause each pallet to come to a certain vertical position depending on the weight of a piece of fruit which it has accepted from a feeder and is carrying towards a gang of grade receiver receptacles.

In the accompanying drawings:—

Fig. 1 is a perspective view of the machine;

Fig. 2 is a diagrammatic vertical sectional elevation of the machine;

Fig. 3 is a perspective view of the trailing hose feeder;

Fig. 4 is a fragmentary sectional elevation view explanatory of the operation of the feeder (Fig. 3);

Fig. 5 is an enlarged vertical section through a float can with the guided float, a pallet and ejector;

Fig. 6 is a fragmentary perspective view of one of the pallets with its ejector;

Fig. 7 is a top plan view corresponding with Fig. 6 and explanatory of the functioning of the ejector yoke;

Fig. 8 is a fragmentary suggestive view indicating an alternative method of counterbalancing the pallets by means of springs;

Fig. 9 is an end elevational view corresponding with Fig. 8; and

Fig. 10 is another fragmentary sectional elevation explanatory of a bob weight counter-balance arrangement for the pallets.

The feed tray 20, for which a hopper may be substituted, terminates in a launder or spout neck 21 through which fruit is delivered piece by piece by gravity onto a trailer hose 22 (Fig. 3) constructed of flexible fabric; this hose is U-shaped in section and is supported along its open top edges by a wire frame 23. At its back end it is supported by a bracket 24 and at its front end by a yoke bracket 25; its trailing end 26 is open. 27 is a stud frame connected up by hoop frame 28 and carrying a floor plate 29. The top ends of the stud frame 27 carry cross frames 31 on which a driving shaft 32 is mounted for rotation; this shaft being geared through the bevel wheels 33 to the spindle 34 which carries the turret. At the top end of the turret is a disc table top 30 pierced with a circular assembly of holes 35 each large enough to pass the largest piece of fruit on which the grader is intended to operate; these holes 35 are arranged in as close order as is practicable having regard to the structural form of the pallet construction below.

Below each hole 35 the turret supports a pallet. The pallets 36 are cup shaped, open at the outer side and supported on tubular rods 37 and fitted with guides 38 which run freely on vertical guide rods 39. The tubular rods 37 run freely through holes 40 in the cover plates 41 of float chambers 42 which are supported on the bottom plate 29 of the turret. At the bottom end of it each tubular rod 37 carries a float 43, and with this float constitutes a hydrometer-like structure. The buoyancy of the float 43 may be adjusted by loading it with bullets or other weighting, and each float is adjusted for buoyancy according to the various grades of fruit to be dealt with, the adjustment being such that the float proper 43 is just about submerged by the weight of the lightest pieces to be graded, with the result that the vertical movement as the float sinks further is very considerable for small differences in weight. The consequence is that the float sets at a different height for each weight; the difference in level of the pallets is availed of to procure the ejecting of the fruit pieces into the appropriate receiver receptacles. Three such receptacles 44, 45, 46 are shown hung around one sector of the frame. For each of these receptacles a striker 47 is fitted; these strikers are adapted to engage the ejectors. Each pallet is fitted with an ejector consisting of a bent wire yoke 48, the shank portion of which is rotatably mounted at 49 in the side of the cup, the tail piece or tappet 50 being extended radially outward so that its path of movement will come in the range of the strikers 47. The respective strikers are disposed at different levels so that they will be appropriately engaged by the tappets 50. As each tappet is struck (see Fig. 7) the yoke 48 is swung around on its pivot portion 49 and the piece of fruit is ejected laterally off the pallet cup into the appropriate receptacles 44, 45, 46, and so on.

As the fruit passes down the chute 21 onto the open hose 22 the pieces crowd one behind the other, but their movement is blocked in the hose. As, however, the table 30 rotates it imparts a sinuous movement to the bottom of the hose 22 with the result that the pieces of fruit are caused to creep along the hose in single file and as they come out of the open end 26 of it to fall successively into the pallet holes 35, whence they are received onto the pallets.

In the alternative arrangement shown in Figs. 8 and 9 the float supports for the vertically movable pallets are dispensed with and the pallets are supported on gaff arms 60 which are held up by helical springs 61 in tension, and these springs are adjusted for loading by means of screw bolt fittings 62 or otherwise. 63 is a check for limiting the upward movement of the gaff 60.

In the alternative arrangement shown in Fig. 10, the gaff supports 60 for the pallets are provided with crank tails 65, and bob weights 66 are adjustably fixed on these tails 65. Neither of these arrangements is found to be as effective as the float arrangement and it is therefore proposed to utilize the float system for supporting the pallets in all cases.

What I claim as my invention and desire to secure by Letters Patent is:—

1. A fruit grader comprising a rotatable turret havig a floor plate and a perforated table top, a circular assembly of float chambers carried on said floor plate, a guided float in each chamber said float having a buoyant bottom portion with a stem and a pallet supported on said stem, means for setting fruit on said pallets, and means controlled by variation in the vertical position of the respective loaded pallets for ejecting the fruit therefrom into different receptacles.

2. A fruit grader according to claim 1 including receiver receptacles disposed laterally of the pallets, a striker associated with each said receptacle, and an ejector on each pallet adapted to be operated by engagement with one or other of said strikers and adapted when so operated to eject the fruit piece from such pallet into the receptacle whose striker engages it.

3. A fruit grader comprising a rotatable turret having a floor plate and a perforated table top, a circular assembly of float chambers carried on said floor plate, a guided float in each chamber having a buoyant bottom portion, with a stem and an open sided cup-shaped pallet supported on said stem, means for setting fruit on said pallets, a swing yoke with a tappet tail piece mounted on each pallet, and strikers adapted to be engaged by said tail pieces as the pallets pass the mouths of the receiver receptacles.

In testimony whereof I affix my signature.

GEORGE FREDERICK LITCHFIELD.